J. W. HYDE.
Measuring Scale for Coffins.

No. 58,262. Patented Sept. 25, 1866.

Witnesses:

Inventor:

UNITED STATES PATENT OFFICE.

JAMES W. HYDE, OF LEWISTON, ILLINOIS.

IMPROVEMENT IN MEASURING-SCALES FOR COFFINS.

Specification forming part of Letters Patent No. 58,262, dated September 25, 1866.

*To all whom it may concern:*

Be it known that I, JAMES W. HYDE, of Lewiston, Fulton county, State of Illinois, have invented a new and Improved Measuring Rule or Scale; and I do hereby declare that the following is a full, clear, and exact description thereof, which will enable others skilled in the art to make and use the same, reference being had to the accompanying drawings, forming part of this specification.

The present invention relates to a new and useful rule or scale for the laying out or marking of the top and bottom boards of coffins or other caskets employed for the burying of deceased persons, which will be now described, as well as the manner of its use, reference being had to the accompanying plate of drawings, in which—

Figure 1:
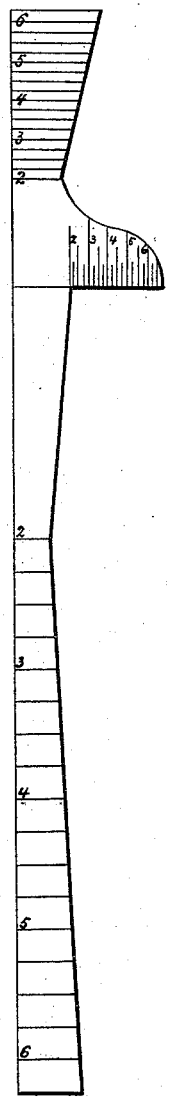
Figure 3:
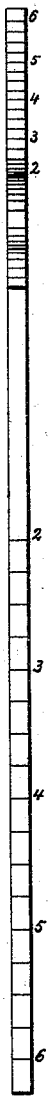
Figure 2:
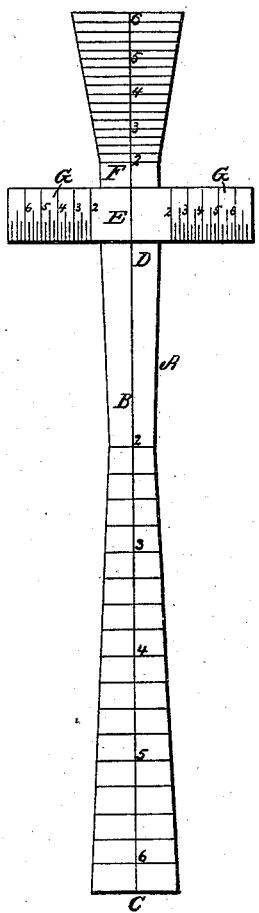
Figure 4:
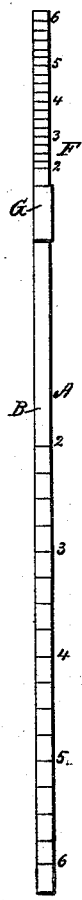

Figures 1 and 2 are plan views of the scale or rule; and Figs. 3 and 4 both edge views, respectively, of Figs. 1 and 2.

Similar letters of reference indicate like parts.

A in the drawings, represents the form of scale or rule for laying or marking out the bottom boards of coffins, and it is made of a cross shape with the longer leg, B, of the cross made wider at its lower end, C, than at the point D, where it is intersected by the cross-bar E, and marked with a series of cross graduations from its wider end nearly to the cross-bar, numbered from 2 to 6, inclusive, from the cross-bar to the wider end, which marks or figures indicate feet and the various graduations between the several numbers, fractions of a foot.

The shorter leg, F, of the cross is wider at its outer end than at the point where intersected by the cross-bar E, and is also marked with a series of transverse graduations numbered from 2 to 6, inclusive, from the cross-bar to the wider end, which numbers indicate feet and the various graduations between them— fractional parts of a foot.

The cross-bar E is marked with a series of graduations upon each of its arms G G, which series of graduations are both similarly numbered from 2 to 6, inclusive, from the leg of the cross out toward the outer ends of the arms G G, the graduations between the several numbers indicating fractional parts of a foot.

The use of this scale for laying out the bottom board of a coffin is as follows: Suppose, for instance, you desire a five-foot coffin. To save stock, lay the scale upon the board so that the graduations marked figure 5 of both the longer leg and arm will coincide therewith, when, with a scratch-awl or other suitable tool, prick or mark the board at every graduation of the scale or rule marked figure 5, after which, removing the scale, draw lines from point to point pricked, and the exact figure and perfect outline of the board for the bottom of a coffin can be produced by simply following or sawing out the board by such lines, the relation between the several graduations of the cross-scale being intended to be such as to produce the same as well as the tapering form of its legs.

In the laying or marking out of the top boards of coffins the same *modus operandi* is followed, only you lay out right and left, as the scale is marked upon both sides for that purpose, the scale represented in Figs. 1 and 3 being adaptable for the tops of coffins.

I claim as new and desire to secure by Letters Patent—

A scale or rule for the purposes specified, the same consisting of the form A, having legs B F of different lengths, tapered and graduated substantially as described, and the cross-bar E, with graduated arms G G, as and for the purpose specified.

JAMES W. HYDE.

Witnesses:
H. C. ABERNATHY,
GEORGE WHITAKER.